United States Patent [19]

Day

[11] Patent Number: 4,873,873

[45] Date of Patent: Oct. 17, 1989

[54] AIR FLOW METERING TERMINAL AND CONTROL SYSTEM

[75] Inventor: James L. Day, Victor, N.Y.

[73] Assignee: James L. Day Co., Inc., Victor, N.Y.

[21] Appl. No.: 150,968

[22] Filed: Feb. 1, 1988

[51] Int. Cl.$^4$ .............................................. G01F 1/44
[52] U.S. Cl. ................................. 73/861.63; 137/486
[58] Field of Search ................... 73/861.63, 53, 861.53; 137/486, 487.5

[56] References Cited

U.S. PATENT DOCUMENTS

| | | |
|---|---|---|
| 2,472,949 | 6/1949 | Jackson . |
| 2,915,078 | 12/1959 | Ochs . |
| 3,724,503 | 4/1973 | Cooke . |
| 3,795,145 | 5/1974 | Miller . |
| 4,375,224 | 3/1983 | Noll . |
| 4,387,685 | 6/1983 | Abbey .............................. 73/861.53 |
| 4,605,160 | 8/1976 | Day . |

FOREIGN PATENT DOCUMENTS 1187229  3/1959  France .

*Primary Examiner*—Joseph A. Orsino
*Assistant Examiner*—Hollis T. Chen
*Attorney, Agent, or Firm*—Martin LuKacher

[57] ABSTRACT

A system for metering the flow rate of air through a duct in which gates are pivotally mounted and connected together to vary the area of the duct. The gates are balanced so as to be effectively weightless. The forces on and the position of the gates correspond to the pressure and the flow rate in the duct thereby avoiding the need for air pressure transducers exposed to the pressure in the duct. The forces due to the pressure in the duct are amplified by the gates so that the pressure measurement as a function of the forces on the gates is a much more sensitive function of the flow rate through the duct than is obtainable directly in response to the pressure in the duct (for example, the velocity pressure of air as measured by pressure transducers responsive directly to the velocity pressure in the duct). A computer system is responsive to the position of the gates and to the magnitude of an actuating signal (the fluid pressure applied to an actuating cylinder coupled to the gates) for determining the air flow rate and for varying the actuating signal in order to control the area in the ducts between the gates so as to obtain a desired air flow rate.

15 Claims, 1 Drawing Sheet

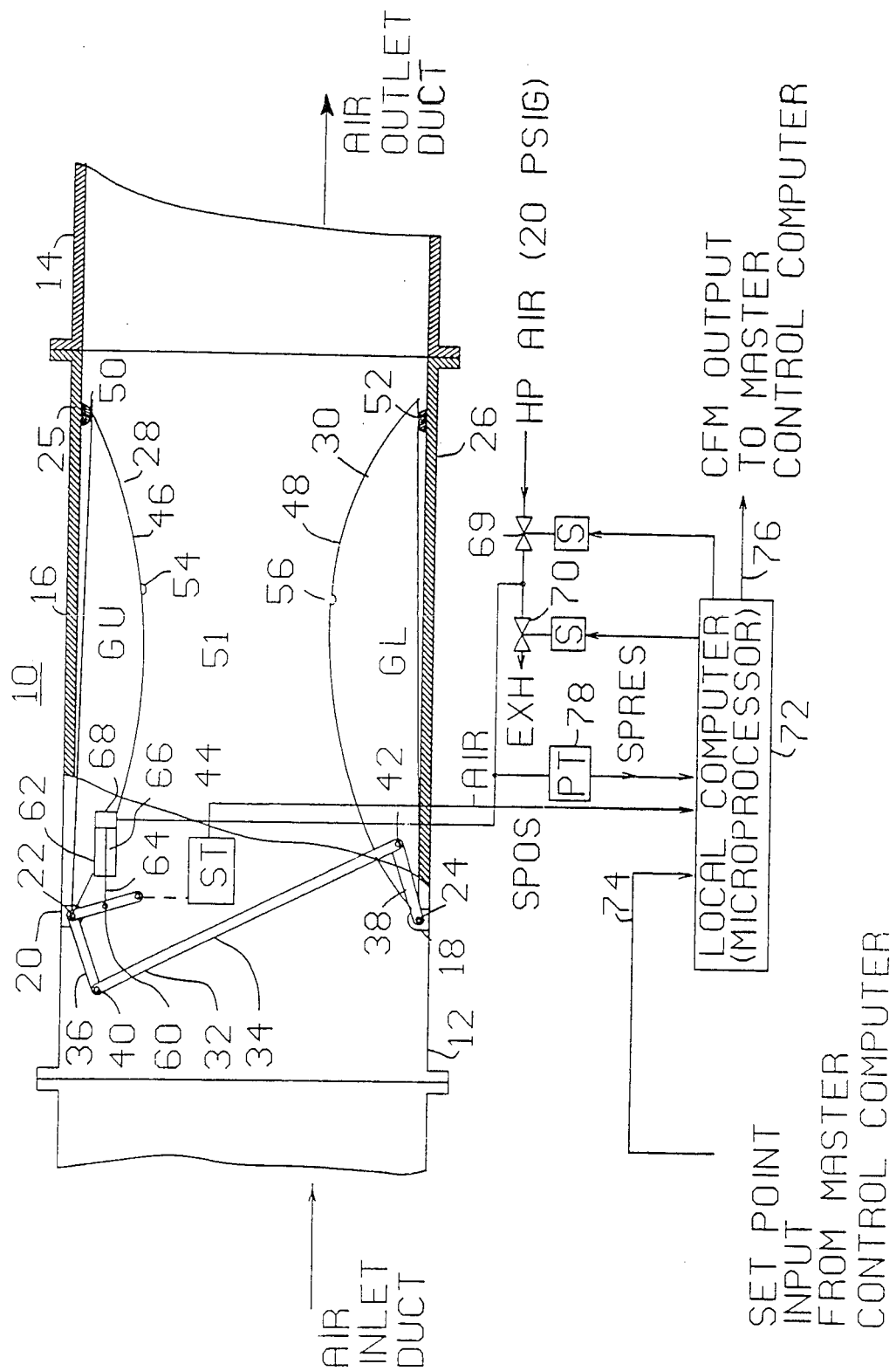

AIR FLOW METERING TERMINAL AND CONTROL SYSTEM

The present invention relates to air flow metering systems and particularly to a system for metering and controlling the air flow rate through a duct.

The invention is especially suitable for use in heating, ventilating and air conditioning (HVAC) installations for metering or control of air flow at terminals which feed air into rooms or areas of a structure. The system provides an output corresponding to the flow rate, for example, in cubic feed per minute (CFM) which may be used to charge the user, much in the same way as the user is charged for gas or electric utility service, for heated or cooled air actually used.

Metering units for air flow rate have consisted of arrangements of dampers for changing the area through which air can flow and therefore its rate of flow. Separate pressure detectors in the duct have been used to determine the flow rate and provide outputs for controlling actuators which position the dampers. A terminal unit using pitot pressure sensors and a damper rotator is shown in U.S. Pat. 3,375,224 issued Mar. 1, 1983 to R. W. Noll. Other systems have involved pressure sensors on opposite sides of an orifice or reduced area in the duct. See U.S. Pat. No. 3,795,145 issued Mar. 5, 1974 to H. Miller and U.S. Pat. No. 3,724,503 issued Apr. 3, 1973 to G. M. Cooke, wherein a pair of plates define a Venturi orifice which is set at a fixed position to obtain a certain air flow. Other examples involving the use of Venturis for controlling air and other fluid flow rates, which have been disclosed even prior to the Cooke patent, are shown in French Patent No. 1,187,229, and U.S. Pat. Nos. 2,472,972 and 2,915,078.

Other pressure transducers have been used for flow measurement. These are turbine meters, hot wire anemometers and orifice plate differential pressure measurement devices which determine velocity pressure in a duct from the difference between the total pressure and the static pressure. While turbine meters and anemometers are sensitive over a wide flow range, they are very expensive and require exposure too the flow in the duct. In cases where hazardous flows are involved, for example, explosive, corrosive or toxic mixtures, the use of any device which must sample or otherwise be exposed to the gas in the duct is undesirable. It will be appreciated as the description proceeds that the term "air" includes and comprehends gases of various kinds and types, including atmospheric air, which may be carried by a duct. Differential pressure meters are not accurate or sensitive even at relatively high flow rates. For example, at a flow rate of 2,000 FPM the pressure is only one inch of water, this is because velocity pressure varies with the square of the flow rate. Therefore, instruments which directly measure pressure are usually insensitive to variations in flow rate, especially at lower flow rates.

It is the principal object of the present invention to provide an improved air flow metering system which combines flow control and measurement in a single unit and avoids the need for air pressure sensors.

It is a more specific object of the present invention to provide an improved air flow metering system wherein air flow is measured indirectly in response to the pressure of the air against air flow control gates and has the ancillary advantage of providing volumetric control accuracy (measurement of the flow rate) especially in the lower control range (at low flow rates).

It is a still further object of the present invention to provide an improved air flow metering system which does not require pressure sensors in the air stream and unlike such systems as use pressure sensors, is not adversely affected by wet, dirty, toxic or corrosive flows which would cause sensors to plug, corrode, be contaminated or deteriorate; nor is the diversion of any toxic air outside the controlled environment necessary.

An important feature of the invention which enables indirect measurement of flow rates by the pressure acting on gates (by which term is meant dampers or other mechanical flow control devices) is to arrange the gates in balanced relationship so as not to be affected by their weight. Accordingly when air is not moving in the duct and there are no external forces, the entire system is essentially weightless. The pressure acting on the gates and the position thereof is a function of the flow rate. Preferably a balanced arrangement of gates in the duct, wherein the gates are mechanically linked to each other so that the weight of one of the gates acts in opposite direction to the weight of the other, may be used. The gates can be opened 100%, or 50% of a desired flow rate or can be infinitely positioned, ie: closed or located at any position inbetween in response to an actuating signal which operates an actuator for driving the mechanically linked gates. In addition the forces which are measured may be mechanically amplified due to the mechanical advantage provided by the gates acting as levers about a pivot, thereby increasing the sensitivity and accuracy of the flow rate measurement, especially at low flow rates.

Briefly described, an air flow metering system embodying the invention wherein air flow rate in a duct is both measured and controlled makes use of means movable in the duct for controlling the area therein for the passage of air therethrough in accordance with the position thereof, actuator means operative in response to an actuating signal moves the area controlling means and changes the position thereof. Position sensor means provides a first output in response to the position of the area controlling means. Transducer means is responsive to the signal which actuates the actuator and provides a second output which is a function of the air pressure in the duct against the area controlling means. Means are provided which are responsive to these outputs for determining the flow rate in the duct. The latter means may also be used for varying the actuating signal to set the flow rate at a desired set point.

The foregoing and other objects, features and advantages of the invention, as well as a presently preferred embodiment thereof, will be better understood from a reading of the following description in connection with the accompanying drawing which is a diagrammatic view of a metering terminal embodying the invention which includes a schematic diagram of its electrical and piping circuits.

Referring more particularly to the drawing, there is shown a metering terminal unit 10 which is connected between air inlet and outlet ducts 12 and 14 and is provided by a duct section 16. In a typical embodiment these ducts may be one foot square. The duct section 16 may be a foot and a half long. Inside the duct section 16 and mounted in bearings on brackets 18 and 20 are upper and lower axles 22 and 24. These axles are opposite to each other and are disposed along opposite sides (the top and bottom walls 25 and 26 of the duct section 16). Upper and lower gates GU and GL 28 and 30 are cantilevered on the axles 22 and 24 respectively. The weights of these gates are approximately equal so that they are in balanced relationship. This balanced relationship is obtained by a mechanical linkage 32 which links the axles 22 and 24 together. This linkage is a pantagraph including a center link 34 which is connected to parallel links 36 and 38 at pivots 40 and 42. The parallel links 36 and 38 are attached to and rotate with the axles 22 and 24. The linkage and its associated mechanisms are located outside the duct on the vertical outside side wall 44. The only parts internal of the duct are the gates 28 and 30 and the axles 22 and 24. In lieu of a pantagraph linkage, the axles 22 and 24 may be coupled together, say by gearing so that the gates 28 and 30 are in balanced relationship.

The gates 28 and 30 are shown as air foil type structures with opposing arcuate surfaces 46 and 48. These surfaces define a Venturi passage 51 through the duct. The gates rest on stops 50 and 52 which, in their rest position, provide an area through the duct which controls the flow rate to be at slightly greater (e.g., 110%) of the rated flow rate. The surfaces may have a ridge and notch 54 and 56 which engage when the gates are closed, thereby better sealing the duct and reducing to essentially zero the flow to the outlet duct 14.

Gates which define a Venturi passage 51 are preferred since they introduce less turbulence than other shapes, such as flat plates. A Venturi also makes the relationship between velocity pressure and the area of the gate somewhat more linear than other shapes such as flat plates. However, the system is operative with flat plate gates which come together at their free or unpivoted edges.

In order to control the position of the gates 28 and 30 a lever 60 is connected to one of the axles. This is shown in the drawing as the upper axle 22. Connected to this lever is an actuator cylinder 62 having a connector rod 64 and a piston 66 which defines a chamber 68. The gates are movable together when the lever 60 is rotated. The lever is also connected to a position sensor ST which may be a potentiometer responsive to its rotation, or other displacement transducer.

The cylinder 62 is actuated by variable instrument air pressure (suitably up to 20 PSIG) which is supplied on line 63 from the junction between a make up solenoid pilot valve 68 and an exhaust solenoid pilot valve 70. The solenoids of these valves are controlled by a local computer (microprocessor) 72 which may be coupled via suitable data input and output lines 74 and 76 to a master control computer which can balance the air flow to an entire structure, meter the CFM delivered at each terminal unit for billing purposes and provide other control functions for the structure (for example, control of security systems). The computer receives n input from the position transducer ST which is an electrical input ($S_{pos}$). The actuating signal is a pneumatic signal which is supplied to the chamber 68 of the cylinder 62. This signal is converted by a pressure transducer 78 into an electrical pressure signal ($S_{pres}$) which is supplied to the computer 72.

The computer is programmed empirically with a table of position and pressure data which may be obtained at various position and pressure settings corresponding to different CFM flow rates. It will be appreciated, of course, that the $S_{pos}$ and $S_{pres}$ signals are digitized in the computer 72 in order to establish the table as well as during dynamic operation of the system.

Using the table the computer solves for flow and provides an output indicating the CFM through the duct 16. When set point inputs are provided, the computer executes a comparison program and provides control inputs to the solenoids of the valves 68 and 70. These control signals may be variable pulse width signals, the width being determined by the difference between the measured CFM output and the set point CFM. After each pulse an interrupt is provided to the microprocessor to initiate another CFM output determination and comparison with set point. The process is iterated until the CFM output equals the set point CFM.

From the foregoing description, it will be apparent that there has been provided an improved system for measuring and controlling air flow through a duct. Variations and modifications of the herein described system within the scope of the invention will undoubtedly suggest themselves to those skilled in the art. For example, an electrically operated actuator can be used instead of a single acting cylinder 62. Strain gages can be used for sensing force. Other applications may be found for the invention, for example, accordingly, the foregoing description should be taken as illustrative and not in a limiting sense.

I claim:

1. An air flow metering system wherein air flow rate in a duct is both measured and controlled, said system comprising means movable in said duct for controlling the area therein for the passage of air therethrough in accordance with the position thereof, actuator means operative in response to an actuating signal for moving said controlling means and changing the position thereof, position sensor means for providing a first output in response to the position of said controlling means, transducer means responsive to said actuating signal for providing a second output which is a function of the air pressure in said duct against said controlling means, and means responsive to said first and second outputs for determining the flow rate in said duct.

2. The system according to claim 1 wherein said means responsive to said first and second outputs includes means for varying said actuating signal to meter the flow rate through said duct.

3. The system according to claim 1 wherein said control means includes a programmed digital computer.

4. The system according to claim 3 wherein said controlling means is a gate in said duct, and said computer includes means for computing said flow rate from the pressure against said gate represented by said second output and the position of said gate as represented by said first output.

5. The system according to claim 4 wherein said computer has means responsive to a set point input which represents a desired flow rate for varying said actuating signal until said first and second outputs correspond to said desired flow rate.

6. The system according to claim 1 wherein said controlling means comprises a pair of gates movably disposed in balanced relationship in said duct.

7. The system according to claim 6 wherein each of said pair of gates is of approximately equal weight, and means coupling said gates together for conjoint movement.

8. The system according to claim 7 wherein said gates are pivotally mounted along opposite sides of said duct, and said coupling means being means for translating the movement of one of said pair of gates in response to the weight thereof which is in one direction into movement of the other of said gates in the opposite direction and vice versa such that said gates are in said balanced relationship.

9. The systems according to claim 8 wherein said gates are pivotally mounted on axles extending along opposite sides of said ducts, said axles being opposed to each other and rotatable with said gates, said coupling means connecting said axles and being rotatable therewith, and said actuator means being coupled to at least one of said axles for rotating both of said axles.

10. The system according to claim 9 wherein said axles are disposed adjacent said opposite sides of said duct and said gates are cantilevered on their respective axles to move towards each other to change the area of said duct for metering the flow of said air.

11. The system according to claim 9 wherein said coupling means is a pantagraph linkage connected to the axles of said gates.

12. The system according to claim 10 wherein said gates having opposing surfaces of arcuate shape which define a Venturi passage through said duct.

13. The system according to claim 9 wherein said actuator means is an actuator cylinder connected through a lever to at least one of said axles, said actuating signal is a fluid pressure and said first output is proportional to the magnitude of said fluid pressure.

14. The system according to claim 13 wherein said position sensor means is a position transducer coupled to at least one of said lever and said cylinder.

15. The system according to claim 10 further comprising stops for said gates on said opposite sides of said ducts and spaced from the axles of said gates, said stops extending inwardly of said duct for engaging said gates at a position corresponding to that which defines an area greater than that corresponding to 100% of the desired air flow rate through said duct.

* * * * *